US012351150B2

United States Patent
Bondy et al.

(10) Patent No.: US 12,351,150 B2
(45) Date of Patent: Jul. 8, 2025

(54) THREE-DIMENSIONAL PARKING ASSIST

(71) Applicant: Ford Global Technologies, LLC, Dearborn, MI (US)

(72) Inventors: Bradford S. Bondy, St. Clair Shores, MI (US); Mahmoud Y. Ghannam, Canton, MI (US); Muhannad Hamdan, Canton, MI (US); Christian Wegner, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 250 days.

(21) Appl. No.: 18/180,407

(22) Filed: Mar. 8, 2023

(65) Prior Publication Data

US 2024/0300457 A1 Sep. 12, 2024

(51) Int. Cl.
  *B60T 7/22* (2006.01)
  *B60Q 9/00* (2006.01)
(52) U.S. Cl.
  CPC ............... *B60T 7/22* (2013.01); *B60Q 9/008* (2013.01); *B60T 2210/00* (2013.01); *B60T 2250/04* (2013.01)
(58) Field of Classification Search
  CPC .... B60T 7/22; B60T 2210/00; B60T 2250/04; B60Q 9/008
  See application file for complete search history.

(56) References Cited

U.S. PATENT DOCUMENTS

| 8,396,653 | B2 | 3/2013 | Rottner et al. |
| 9,082,020 | B2 | 7/2015 | Choi et al. |
| 10,147,323 | B2 | 12/2018 | Gieseke |
| 2005/0073433 | A1* | 4/2005 | Gunderson ........... G01S 13/931 340/903 |
| 2006/0080005 | A1 | 4/2006 | Lee et al. |
| 2012/0065877 | A1* | 3/2012 | Jecker ................... G01S 15/931 701/300 |

(Continued)

FOREIGN PATENT DOCUMENTS

| CN | 110745072 A | 2/2020 |
| CN | 112307594 A * | 2/2021 ........... G01S 13/931 |

(Continued)

OTHER PUBLICATIONS

Machine Translation of CN-112307594-A (Year: 2021).*

(Continued)

*Primary Examiner* — Sahar Motazedi
(74) *Attorney, Agent, or Firm* — Frank Lollo; Brooks Kushman P.C.

(57) ABSTRACT

Systems and methods for providing a three-dimensional (3-D) parking assist feature include receiving sensor data from a plurality of different sensors with respect to a 3-D volume surrounding a top side of a vehicle, lateral sides of the vehicle, and at least one longitudinal end side of the vehicle, determining a 3-D envelope around the vehicle defined by a closest object relative to each of the top side, the lateral sides, and the at least one longitudinal end side of the vehicle, and outputting a distance measurement of the 3-D envelope relative to each of the top side, the lateral sides, and the at least one longitudinal end side of the vehicle on one or more vehicle display, wherein a negative distance is indicative of an overshoot or interference condition.

20 Claims, 8 Drawing Sheets

(56) References Cited

U.S. PATENT DOCUMENTS

| | | | | |
|---|---|---|---|---|
| 2015/0266509 A1* | 9/2015 | Ignaczak | ............ | B62D 15/027 |
| | | | | 701/1 |
| 2015/0353132 A1* | 12/2015 | Franganillo | .......... | B62D 15/028 |
| | | | | 701/41 |
| 2018/0050637 A1* | 2/2018 | Tan | ........................ | B60R 1/27 |
| 2018/0101739 A1* | 4/2018 | Zhang | .................... | G06V 20/58 |
| 2019/0026947 A1* | 1/2019 | Herman | ................. | H04N 23/63 |
| 2020/0023834 A1* | 1/2020 | Gowda | ................ | G05D 1/0257 |
| 2022/0161850 A1 | 5/2022 | Yu | | |

FOREIGN PATENT DOCUMENTS

| | | | | | |
|---|---|---|---|---|---|
| CN | 113454636 A | | 9/2021 | | |
| DE | 102011103743 A1 | * | 3/2012 | ........... | B62D 15/027 |
| JP | 2001224013 A | | 8/2001 | | |
| WO | WO-2013037530 A1 | * | 3/2013 | ............. | B60K 35/00 |

OTHER PUBLICATIONS

Machine Translation of DE-102011103743-A1 (Year: 2012).*
Machine Translation of WO-2013037530-A1 (Year: 2013).*
Jeong et al., "Low Cost Design of Parallel Parking Assist System Based on an Ultrasonic Sensor", International Journal of Automotive Technology, vol. 11, No. 3, pp. 409-416 (2010) DOI 10.1007/s12239-010-0050-0.

* cited by examiner

THREE-DIMENSIONAL PARKING ASSIST

BACKGROUND

Parking assist systems may use sensors such as ultrasonic sensors and/or cameras to support vehicle parking operations. The sensors can provide data to locate and/or position a vehicle with respect to an environment, e.g., objects in an environment, e.g., during a parking operation.

DETAILED DESCRIPTION

Figure 1:
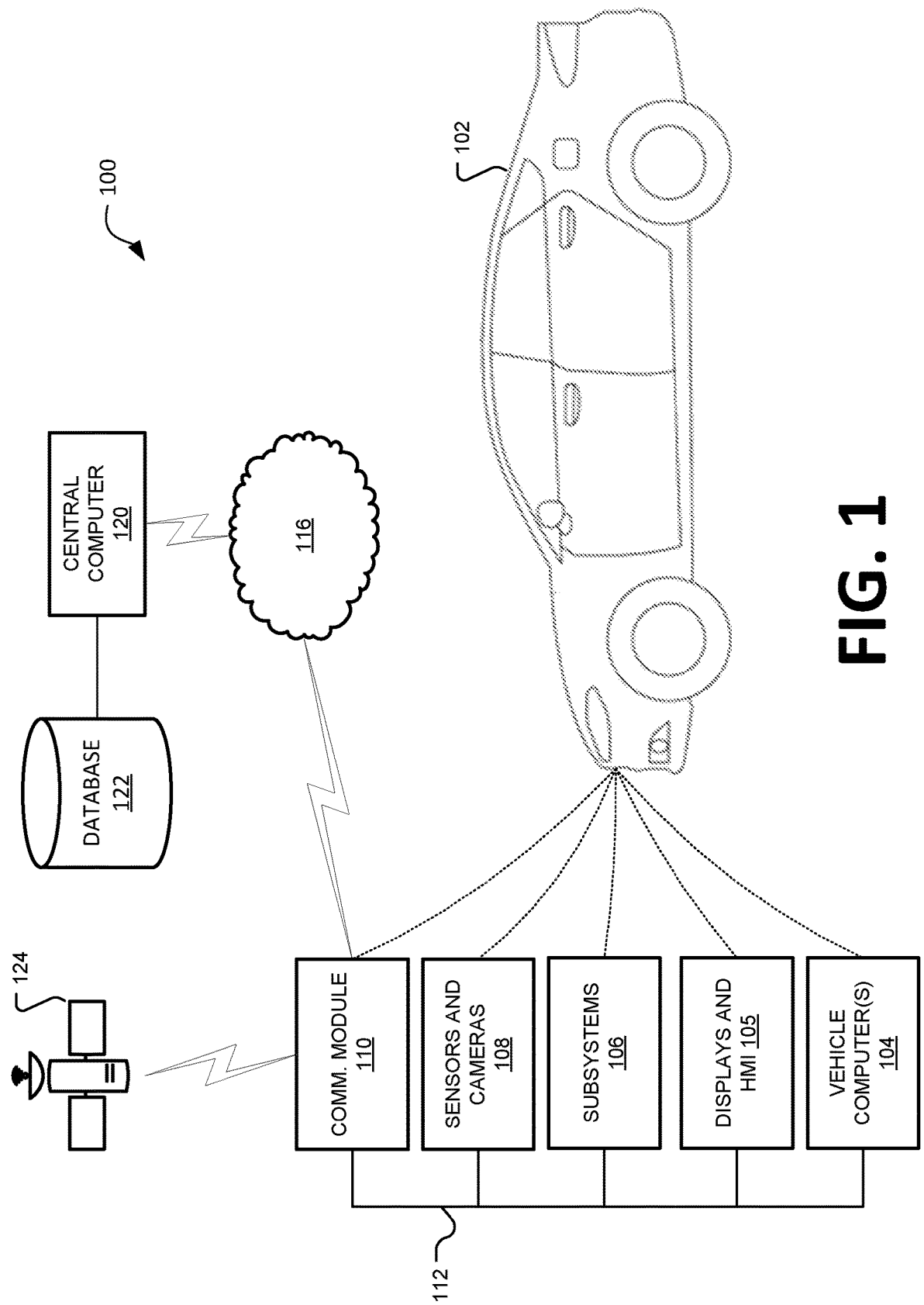
FIG. 1 is diagram of an example system for providing a three-dimensional (3-D) parking assist feature.

A vehicle may include various sensors and/or cameras for supporting driver assistance technology (DAT) such as an ultrasonic parking assist system, an adaptive cruise control (ACC), a blind spot information system (BLIS), a rear cross-traffic alert system, a lane keep assist (LKA) system, a lane centering assist (LCA) system, and the like. The present disclosure describes systems and methods that leverage various sensors and cameras to provide a three-dimensional (3-D) parking assist feature that provides an envelope in three dimensions, typically around at least four sides of the vehicle (i.e., each of the top side, the lateral sides, and at least one longitudinal end side of the vehicle), and defines a closest object relative to respective sides, each of the four sides, of the vehicle. A distance measurement to the closest object relative to each of the sides is displayed to a user, such as on a heads-up display (HUD) or a center stack display, wherein a negative distance is indicative of an overshoot or interference condition. Since a vehicle typically does not include upward-facing sensors, principles of odometry may be used to leverage forward or rearward facing cameras and sensors to measure a volume above the vehicle during movement of the vehicle in a forward or rearward direction.

In one or more implementation, a system may include a vehicle computer including a processor and a memory, the memory storing instructions executable by the processor programmed to: receive sensor data from a plurality of different sensors with respect to a three-dimensional volume surrounding a top side of a vehicle, lateral sides of the vehicle, and at least one longitudinal end side of the vehicle; determine a three-dimensional envelope around the vehicle defined by a closest object relative to each of the top side, the lateral sides, and the at least one longitudinal end side of the vehicle; and output a distance measurement of the three-dimensional envelope relative to each of the top side, the lateral sides, and the at least one longitudinal end side of the vehicle on one or more vehicle display, wherein a negative distance is indicative of an overshoot or interference condition.

In an implementation, the plurality of different sensors may include wheel speed sensors, exterior cameras, ultrasonic sensors, and radar sensors, and the instructions may include instructions programmed to determine the three-dimensional envelope around the vehicle based at least upon odometry and movement of the vehicle in a direction of the at least one longitudinal end side of the vehicle.

In another implementation, the closest object relative to the lateral sides and the at least one longitudinal end side may include a parking line or curb.

In a further implementation, the system may further include instructions programmed to: generate a top view of the vehicle including objects in an environment based upon camera data; and display the top view on a central vehicle display.

In an implementation, the distance measurement of the three-dimensional envelope relative to each of the top side, the lateral sides, and the at least one longitudinal end side of the vehicle may be displayed on the central vehicle display.

In another implementation, a display element associated with the distance measurement of the three-dimensional envelope relative to each of the top side, the lateral sides, and the at least one longitudinal end side of the vehicle may be assigned a different color for each of a plurality of distance ranges.

In a further implementation, the distance measurement of the three-dimensional envelope relative to each of the top side, the lateral sides, and the at least one longitudinal end side of the vehicle may be displayed on a heads-up display (HUD) or instrument panel of the vehicle.

In an implementation, the system may further include instructions to receive an input of a vehicle dimension based upon data received from a user or a camera.

In another implementation, the system may further include instructions programmed to provide an audio or haptic indication or an actuation of a braking system upon the distance measurement of the three-dimensional envelope relative to any one of the top side, the lateral sides, and the at least one longitudinal end side of the vehicle reaching a minimum positive threshold distance.

In one or more implementations, a method may include: receiving sensor data from a plurality of different sensors with respect to a three-dimensional volume surrounding a top side of a vehicle, lateral sides of the vehicle, and at least one longitudinal end side of the vehicle; determining a three-dimensional envelope around the vehicle defined by a closest object relative to each of the top side, the lateral sides, and the at least one longitudinal end side of the vehicle; and outputting a distance measurement of the three-dimensional envelope relative to each of the top side, the lateral sides, and the at least one longitudinal end side of the vehicle on one or more vehicle display, wherein a negative distance is indicative of an overshoot or interference condition.

In an implementation, the plurality of different sensors may include wheel speed sensors, exterior cameras, ultrasonic sensors, and radar sensors, and determining the three-dimensional envelope around the vehicle may be based at least upon odometry and movement of the vehicle in a direction of the at least one longitudinal end side of the vehicle.

In another implementation, the closest object relative to the lateral sides and the at least one longitudinal end side may include a parking line or curb.

In a further implementation, the method may further include: generating a top view of the vehicle including objects in an environment based upon camera data from the exterior cameras; and displaying the top view on a central vehicle display.

In an implementation, the distance measurement of the three-dimensional envelope relative to each of the top side, the lateral sides, and the at least one longitudinal end side of the vehicle may be displayed on the central vehicle display.

In another implementation, the distance measurement of the three-dimensional envelope relative to each of the top side, the lateral sides, and the at least one longitudinal end side of the vehicle may be displayed on a heads-up display (HUD) or instrument panel of the vehicle.

In a further implementation, a display element associated with the distance measurement of the three-dimensional envelope relative to each of the top side, the lateral sides, and the at least one longitudinal end side of the vehicle may be assigned a different color for each of a plurality of distance ranges.

In an implementation, the method may further include receiving an input of a vehicle dimension based upon data received from a user or a camera.

In another implementation, the method may further include providing an audio or a haptic indication or an actuation of a braking system upon the distance measurement of the three-dimensional envelope relative to any one of the top side, the lateral sides, and the at least one longitudinal end side of the vehicle reaching a minimum positive threshold distance.

With reference to FIG. 1, a connected vehicle system 100 can provide communications between a vehicle 102 and a central computer 120 to share data.

Vehicle 102 is a set of components or parts, including hardware components and typically also software and/or programming, to perform a function or set of operations in the vehicle 102. Vehicle subsystems 106 typically include a braking system, a propulsion system, and a steering system as well as other subsystems including but not limited to an advanced driver assist system (ADAS) including various driver assist technology (DAT), a body control system, a climate control system, a lighting system, and a human-machine interface (HMI) system, which may include a heads-up display (HUD), an instrument panel, and infotainment system, as will be discussed further, below. The propulsion subsystem converts energy to rotation of vehicle 102 wheels to propel the vehicle 102 forward and/or backward. The braking subsystem can slow and/or stop vehicle 102 movement. The steering subsystem can control a yaw, e.g., turning left and right, maintaining a straight path, of the vehicle 102 as it moves.

Computers, including the herein-discussed one or more vehicle computers 104, (e.g., one or more electronic control units (ECUs), and central computer 120 include respective processors and memories. A computer memory can include one or more forms of computer readable media, and stores instructions executable by a processor for performing various operations, including as disclosed herein. For example, the computer can be a generic computer with a processor and memory as described above and/or an ECU, controller, or the like for a specific function or set of functions, and/or a dedicated electronic circuit including an Application Specific Integrated Circuit (ASIC) that is manufactured for a particular operation, e.g., an ASIC for processing sensor data and/or communicating the sensor data. In another example, computer may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer.

A computer memory can be of any suitable type, e.g., EEPROM, EPROM, ROM, Flash, hard disk drives, solid state drives, servers, or any volatile or non-volatile media. The memory can store data, e.g., a memory of an ECU. The memory can be a separate device from the computer, and the computer can retrieve information stored in the memory, e.g., one or more computers 104 can obtain data to be stored via a vehicle network 112 in the vehicle 102, e.g., over an Ethernet bus, a CAN bus, a wireless network, etc. Alternatively, or additionally, the memory can be part of the computer, i.e., as a memory of the computer or firmware of a programmable chip.

The one or more vehicle computers 104 (e.g., one or more ECUs) can be included in a vehicle 102 that may be any suitable type of ground vehicle 102, e.g., a passenger or commercial automobile such as a sedan, a coupe, a truck, a sport utility, a crossover, a van, a minivan, etc. As part of a driver assist system or an advanced driver assist system (ADAS), a vehicle computer 104 may include programming to operate one or more of vehicle 102 brakes, propulsion (e.g., control of acceleration in the vehicle 102 by controlling one or more of an internal combustion engine, electric motor, hybrid engine, etc. and control power delivery therefrom), steering, climate control, interior and/or exterior lights, etc., as well as to determine whether and when the computer, as opposed to a human operator, is to control such operations, such as by sending vehicle data over the vehicle network 112. Additionally, a vehicle computer 104 may be programmed to determine whether and when a human operator is to control such operations.

Vehicle computer 104 may include or be communicatively coupled to, e.g., via a vehicle network 112 such as a communications bus as described further below, more than one processor, e.g., included in sensors and cameras 108, electronic controller units (ECUs) or the like included in the vehicle 102 for monitoring and/or controlling various vehicle components, e.g., a powertrain controller, a brake controller, a steering controller, etc. The computer is generally arranged for communications on a vehicle 102 communication network that can include a bus in the vehicle 102 such as a controller area network (CAN) or the like, and/or other wired and/or wireless mechanisms. Alternatively, or additionally, in cases where the computer actually includes a plurality of devices, the vehicle network 112 may be used for communications between devices represented as the computer in this disclosure.

The vehicle network 112 is a network via which messages can be exchanged between various devices in vehicle 102. The vehicle computer 104 can be generally programmed to send and/or receive, via vehicle network 112, messages to and/or from other devices in vehicle 102 e.g., any or all of ECUs, sensors, cameras, actuators, components, communications module, a human machine interface HMI, etc. Additionally, or alternatively, messages can be exchanged among various such other devices in vehicle 102 via a vehicle network 112. In cases in which the vehicle computer 104 includes a plurality of devices, vehicle network 112 may be used for communications between devices represented as a computer in this disclosure. In some implementations, vehicle network 112 can be a network in which messages are conveyed via a vehicle 102 communications bus. For example, vehicle network 112 can include a controller area network (CAN) in which messages are conveyed via a CAN bus, or a local interconnect network (LIN) in which messages are conveyed via a LIN bus. In some implementations, vehicle network 112 can include a network in which messages are conveyed using other wired communication technologies and/or wireless communication technologies e.g., Ethernet, Wi-Fi, Bluetooth, Ultra-Wide Band (UWB), etc. Additional examples of protocols that may be used for communications over vehicle network 112 in some implementations include, without limitation, Media Oriented System Transport (MOST), Time-Triggered Protocol TTP, and FlexRay. In some implementations, vehicle network 112 can represent a combination of multiple networks, possibly of different types, that support communications among devices in vehicle 102. For example, vehicle network 112 can include a CAN in which some devices in vehicle 102 communicate via a CAN bus, and a wired or wireless local area network in which some device in vehicle 102 communicate according to Ethernet or WI-FI communication protocols.

The vehicle computer 104 and/or central computer 120 can communicate via a wide area network 116. Further, various computing devices discussed herein may communicate with each other directly, e.g., via direct radio frequency communications according to protocols such as Bluetooth or the like. For example, a vehicle 102 can include a communication module 110 to provide communications with devices and/or networks not included as part of the vehicle 102, such as a Global Positioning Satellite (GPS) 124 and the wide area network 116, for example. The communication module 110 can provide various communications, e.g., vehicle to vehicle (V2V), vehicle-to-infrastructure or everything (V2X) or vehicle-to-everything including cellular communications (C-V2X) wireless communications cellular, dedicated short range communications (DSRC), etc., to another vehicle or infrastructure typically via direct radio frequency communications and/or typically via the wide area network 116, e.g., to the central computer 120. The communication module 110 could include one or more mechanisms by which a vehicle computer 104 may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth, IEEE 802.11, DSRC, cellular V2X, CV2X, and the like.

A vehicle 102 in accordance with the present disclosure includes a plurality of sensors and cameras 108 that may support the driver assist or ADAS features. For example, sensors and cameras 108 may include, but are not limited to, one or more wheel speed sensor, steering angle sensor, GPS sensor, forward-facing camera, side-facing camera, rear-facing camera, ultrasonic parking assist sensor, short range RADAR, medium range RADAR, light sensor, rain sensor, accelerometer, wheel torque sensors, inertial sensor, yaw rate sensor, etc. Sensors and cameras 108 can support features that uses cameras to detect lane lines, road curvature, and parking lines, sometimes in conjunction with detailed mapping data. Sensors and cameras 108 may also support a lane keep assist (LKA) or lane centering assist (LCA) feature that uses one or more cameras to detect lane lines and a steering angle sensor or support a drive assist feature that uses one or more cameras to detect lane lines or monitor blind spots as part of the BLIS, a steering angle or position sensor, and a driver monitoring system camera (DMSC). Sensors and cameras 108 may also support an adaptive cruise control (ACC) feature that uses wheel speed sensors/GPS and/or cameras/medium range RADAR to support an automatic follow distance feature. Sensors and cameras 108 may also support an intelligent adaptive cruise control (iACC) feature that uses accelerometers, wheel speed sensors/GPS, cameras, and/or RADAR to support cruise control features that alter vehicle speed based upon detected speed limits, accelerations, and road curvature. Sensors and cameras 108 can support a parking assist feature that uses wheel speed sensors, steering sensors, cameras, and/or ultrasonic sensors.

In some vehicle operations, including parking operations, sensors and cameras 108 such as a camera, RADAR sensor, and/or ultrasonic sensor of the vehicle 102 may detect the position and height of objects relative to the position, height, and angle of the sensor and cameras 108 mounted on the body of vehicle 102, including but not limited to the position of lane lines, curbs, overhead signs, speed limit signs, overpasses, and other vehicles, including those in a driver's blind spots in accordance with the BLIS operation. Thus, in combination with the wheel speed sensors, odometry may be used to estimate the height and position of objects above a vehicle prior to the vehicle moving under them.

A vehicle 102 in accordance with the present disclosure includes one or more driver assist systems that provide notifications to a user to support the user assist operation. Such notifications may include audible and/or haptic components. Driver assist systems can rely on data from sensors and cameras 108 for various operations, including determining input such as a vehicle speed, vehicle steering angle, input concerning proximate objects, other vehicles, etc.

A vehicle 102 in accordance with the present disclosure includes displays 105 to display information to the user. The displays 105 may include various types of displays, including an instrument panel cluster or portion thereof including a flat-panel display (e.g., LED, OLED, LCD, AMOLED, etc.), a heads-up display such as a transparent display heads-up display (TD-HUD), and a flat-panel display screen in a center stack of vehicle 102 used for infotainment and/or climate controls and which may be part of a human-machine interface (HMI). The HMI of displays 105 may also include one or more means for inputting data from a user. The displays 105 may be connected to one or more vehicle computer 104 (e.g., ECU) via the vehicle network 112 and may receive signals to display various data, including notifications that include vehicle information.

A central computer 120 may be connected to a database 122. Data may be received by central computer 120 over wide area network 116 from communication module 110 of vehicle 102 and stored in database 122 to be accessed and used by central computer 120. Data from vehicle 102 may include global positioning system (GPS) data and associated 3-D envelope information such as overhead clearance data, curb height data, and the like so that the vehicle 102 may "learn" locations such as a home garage or a work garage. Data from other vehicles may similarly be received by central computer 120 over wide area network 116 and stored in database 122, and then shared with vehicle 102 by central computer based upon the GPS data received from vehicle 102 to assist the 3-D parking assist feature and provide sensor calibration information.

Figure 2A:
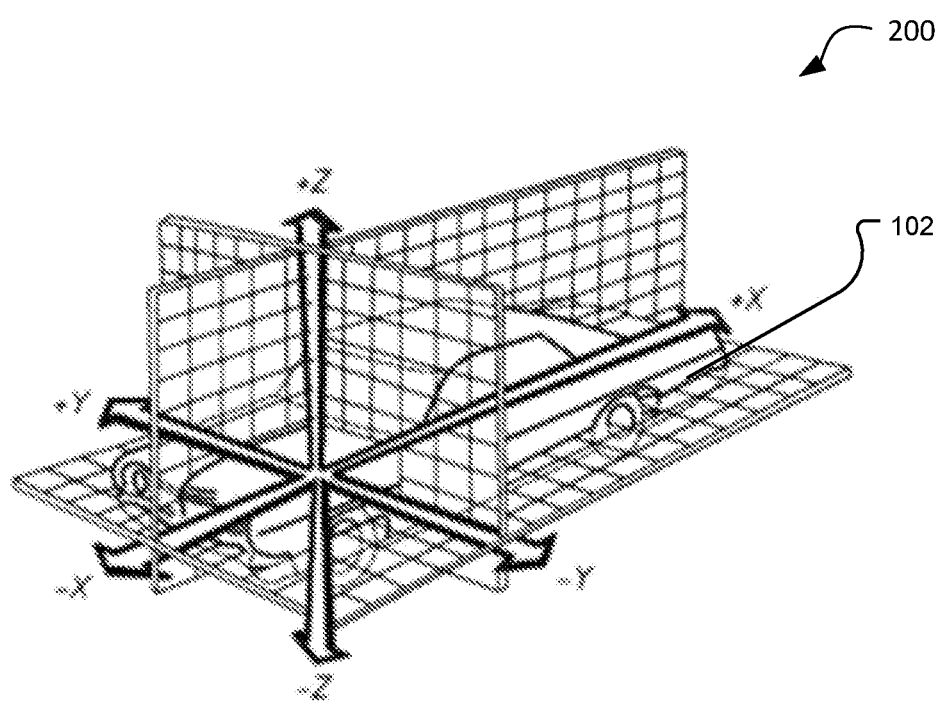
FIG. 2A is an example diagram of a 3-D coordinate system for a vehicle.

With reference to FIG. 2A, an example of a diagram of a 3-D coordinate system 200 for a vehicle 102 is illustrated. The example coordinate system 200 is a Cartesian coordinate system with an origin that may be at a selected point in or outside of the vehicle 102. For example, a positive Z-axis may extend above the vehicle 102 from the origin, and a negative Z-axis may extend from the origin below the vehicle 102. Similarly, a positive X-axis may extend behind the vehicle 102 and a negative X-axis may extend in front of the vehicle 102; a positive Y-axis may extend laterally from a passenger side of the vehicle 102 and a negative Y-axis may extend laterally from a driver side the vehicle 102. Computer 104 will measure the distance to outer portions of vehicle 102 based upon known dimensions of vehicle 102 within a coordinate system 200. The coordinate system 200 is but one example coordinate system, and other coordinate systems may be used without departing from the scope of the present disclosure.

Figure 2B:
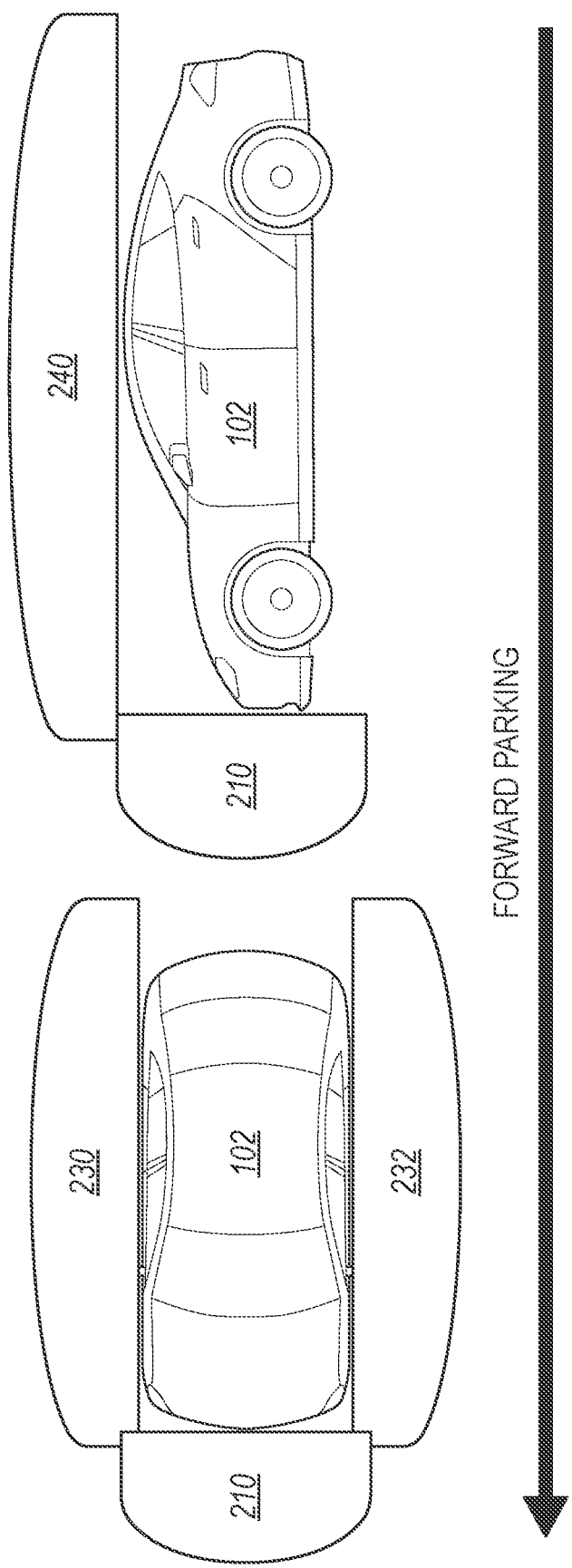
FIG. 2B is an example diagram of a top and side view of a forward parking situation.

With reference to FIG. 2B, an example of a forward parking situation for vehicle 102 that is performing a parking operation is illustrated from both a top view and a side view. For forward parking, the sides of concern when moving forward are the front side (negative X-axis), lateral sides (positive and negative Y-axis), and the top side (positive Z-axis) of the vehicle 102.

In the top view of vehicle 102, various sensors and cameras 108 of vehicle 102 may be used to determine a three-dimensional envelope defining a volume 210 in front of the vehicle 102 along the negative X-axis, and volumes 230 and 232 on lateral sides of vehicle 102 along the positive and negative Y-axis, respectively. Forward facing RADAR, ultrasonic sensors, and cameras may be used to determine a closest object in volume 210. Lateral facing RADAR, ultrasonic sensors, and cameras may be used to determine a closest object in volumes 230 and 232. Additionally, data from the forward facing RADAR, ultrasonic sensors, and cameras may be used to in conjunction with wheel speed and wheel angle sensors to estimate a position of a closest object in volumes 230 and 232 based upon odometry, which means that the motion sensors that detect wheel speed and wheel angle sensors that detect wheel angle(s) (typically of front wheels) may be used to estimate the position of an object detected in a forward position over time as it enters a lateral position relative to the vehicle 102 based on the forward movement of the vehicle 102.

In the side view of vehicle 102, various sensors and cameras 108 of vehicle 102 may be used to determine a three-dimensional envelope defining a volume 210 in front of the vehicle 102 along the negative X-axis and volume 240 on top side of vehicle 102 (i.e., overhead) along the positive Z-axis. Forward facing RADAR, ultrasonic sensors, and cameras may be used to determine a closest object in volume 210. Additionally, data from the forward facing RADAR, ultrasonic sensors, and cameras may be used to in conjunction with wheel speed and wheel angle sensors to estimate a position of a closest object in volume 240 based upon odometry, wherein the motion sensors of the wheel speed and wheel angle sensors may be used to estimate the position of an object detected in a forward position over time as it enters an overhead position relative to the vehicle 102 based on the forward movement of the vehicle 102.

Alternately or additionally, vehicle 102 may include upward facing sensors and/or cameras to directly determine a position of a closest object in volume 240.

Figure 2C:
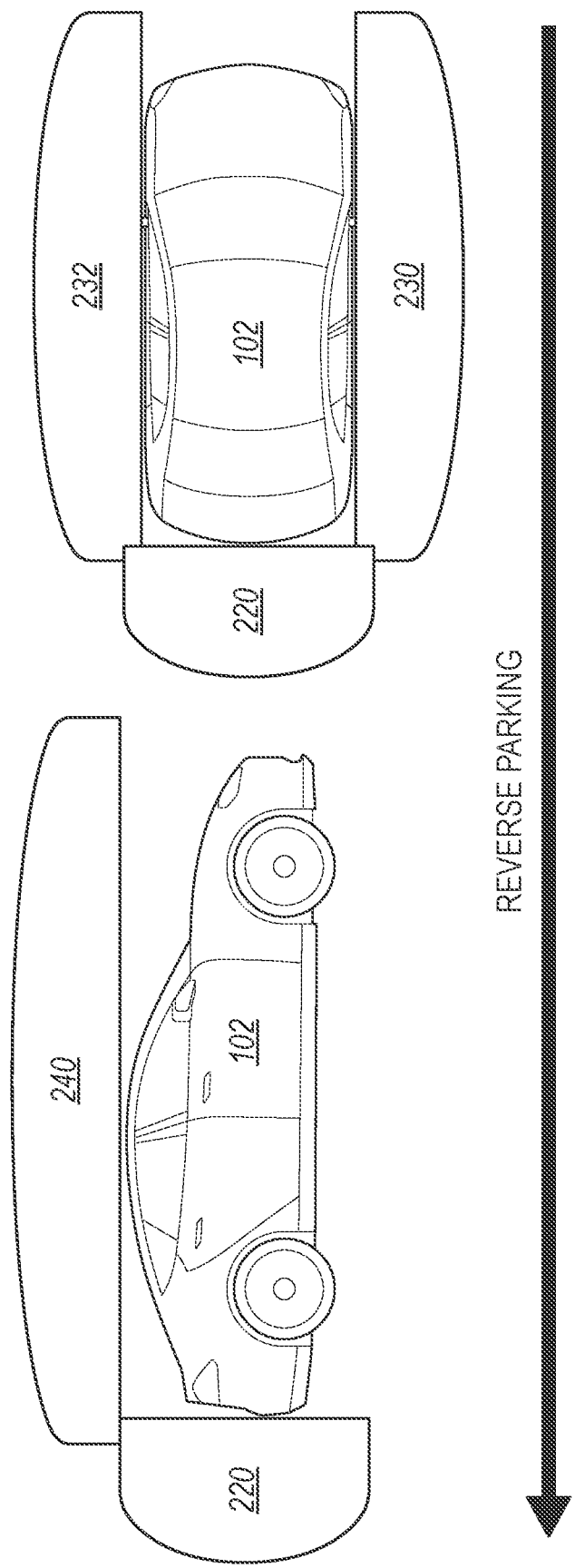
FIG. 2C is an example diagram of a top and side view of a reverse parking situation.

With reference to FIG. 2C, and example of a rearward or reverse parking situation for vehicle 102 is illustrated from both a top view and a side view. For reverse parking, the sides of concern when moving rearward are the rear side (positive X-axis), lateral sides (positive and negative Y-axis), and the top side (positive Z-axis) of the vehicle 102.

In the top view of vehicle 102, various sensors and cameras 108 of vehicle 102 may be used to determine a three-dimensional envelope defining a volume 220 in the rear side of the vehicle 102 along the positive X-axis, and volumes 230 and 232 on lateral sides of vehicle 102 along the positive and negative Y-axis, respectively. Rearward facing RADAR, ultrasonic sensors, and/or cameras may be used to determine a closest object in volume 220. Lateral facing RADAR, ultrasonic sensors, and cameras may be used to determine a closest object in volumes 230 and 232. Additionally, data from the rearward facing RADAR, ultrasonic sensors, and/or cameras may be used to in conjunction with wheel speed and wheel angle sensors to estimate a position of a closest object in volumes 230 and 232 based upon odometry, wherein the motion sensors of the wheel speed and wheel angle sensors may be used to estimate the position of an object detected in a forward position over time as it enters a lateral position relative to the vehicle 102 based on the forward movement of the vehicle 102.

In the side view of vehicle 102, various sensors and cameras 108 of vehicle 102 may be used to determine a three-dimensional envelope defining a volume 220 in the rear side of the vehicle 102 along the positive X-axis and volume 240 on top side of vehicle 102 (i.e., overhead) along the positive Z-axis. Rearward facing RADAR, ultrasonic sensors, and/or cameras may be used to determine a closest object in volume 220. Additionally, data from the rearward facing RADAR, ultrasonic sensors, and/or cameras may be used in conjunction with wheel speed and wheel angle sensors to estimate a position of a closest object in volume 240 based upon odometry, wherein the motion sensors of the wheel speed and wheel angle sensors may be used to estimate the position of an object detected in a rearward position over time as it enters an overhead position relative to the vehicle 102 based on the rearward movement of the vehicle 102.

Figure 3:
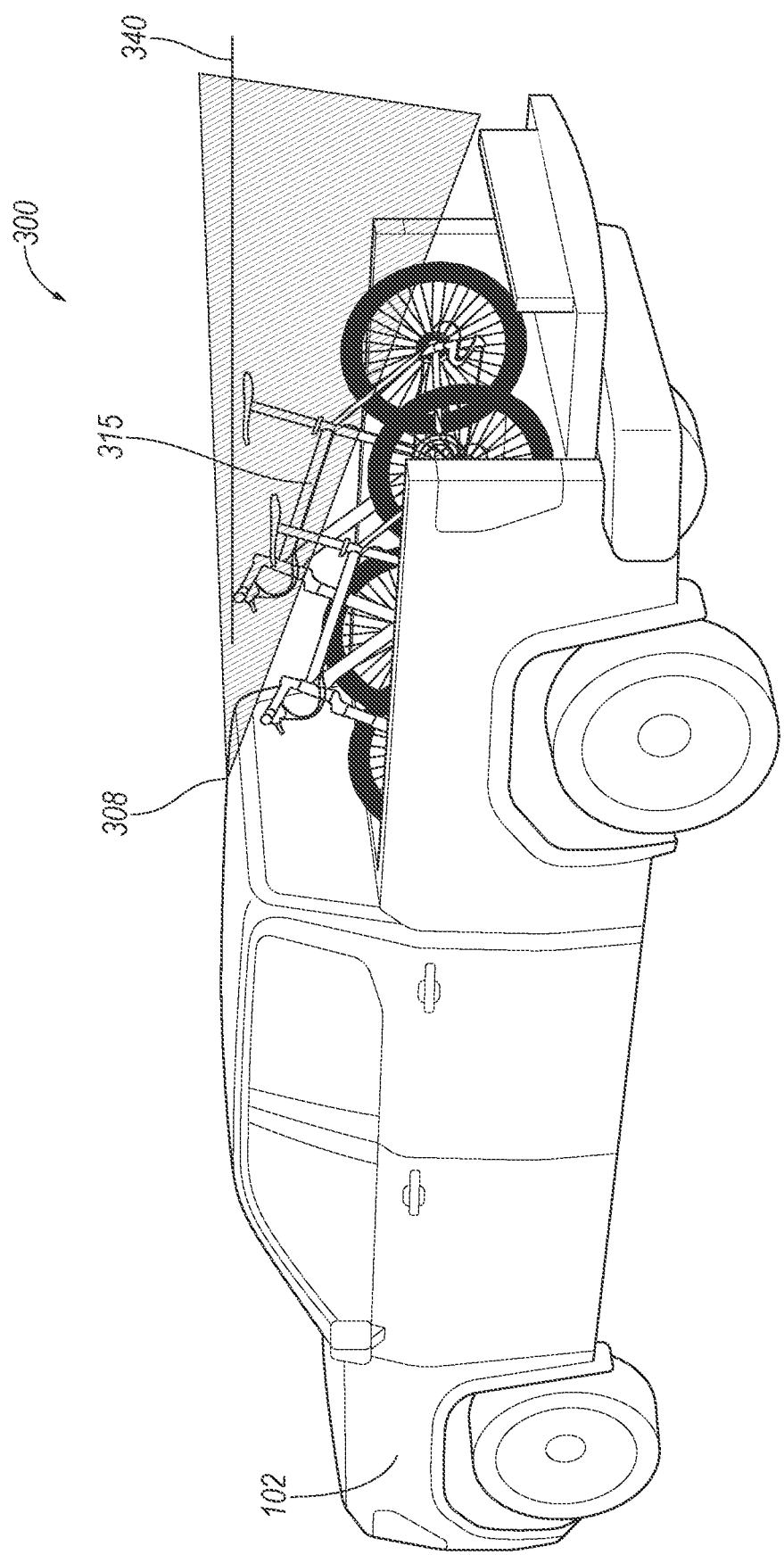
FIG. 3 is an example diagram of a system for adjusting a vehicle height dimension.

With reference to FIG. 3, an example of system 300 for adjusting a vehicle height is illustrated. While discussed with respect to vehicle height, other vehicle dimensions (length or width) may also be detected or input in a similar manner.

A vehicle 102 may carry cargo 315, such as on a roof rack or in a cargo bed (as illustrated), wherein the cargo 315 changes the effective height of the vehicle 102. In the illustrated implementation, a camera 308 with a field of view including the cargo bed may be used to provide images to determine that the cargo height 340 extends beyond a baseline height of the vehicle 102. For example, camera 308 may have a known fixed height relative to the height of the vehicle 102, a known field of view and horizon, a known focal length, and may image portions of the cargo bed having known dimensions. A cargo height 340 may be estimated relative to the known fixed height of the camera 308 using any suitable single view metrology technique based upon image data from camera 308, and may be assisted based upon data from image recognition algorithms. Similarly, a LiDAR sensor associated with camera 308 may provide depth information to allow use of triangulation to calculate a cargo height 340 based upon an image from camera 308. The cargo height 340 may be input as a new height for the vehicle for determination of the distance to the closest object relative to the top side of vehicle 102 (i.e., in volume 240).

In another implementation (not illustrated), a camera and/or LiDAR on a user's cell phone or another vehicle or infrastructure may image vehicle 102, and a computer in the other vehicle or infrastructure may estimate an effective height of the vehicle 102 based upon the cargo 315 using any suitable single view and/or LiDAR-based metrology technique, and transmit a height estimate to the vehicle 102 via V2V or V2X communication.

In yet another implementation (not illustrated), a user may manually input a cargo height 340 of other vehicle dimension into an HMI of the vehicle 102 for use by the present disclosure when using a roof rack or other mechanism that changes an effective height, length, or width dimension of the vehicle 102, and may be prompted for input based upon camera 308 or other sensors detecting a cargo or upon weight sensors indicating a presence of the roof rack or other mechanism (e.g., bike rack on trunk extending a rear or lateral distance of the vehicle 102) or the presence of a cargo load. In a further implementation (not illustrated), an RFID tag on a cargo item may be scanned in order to retrieve dimensional data for calculation of a cargo height 340 or other vehicle dimension.

Figure 4:
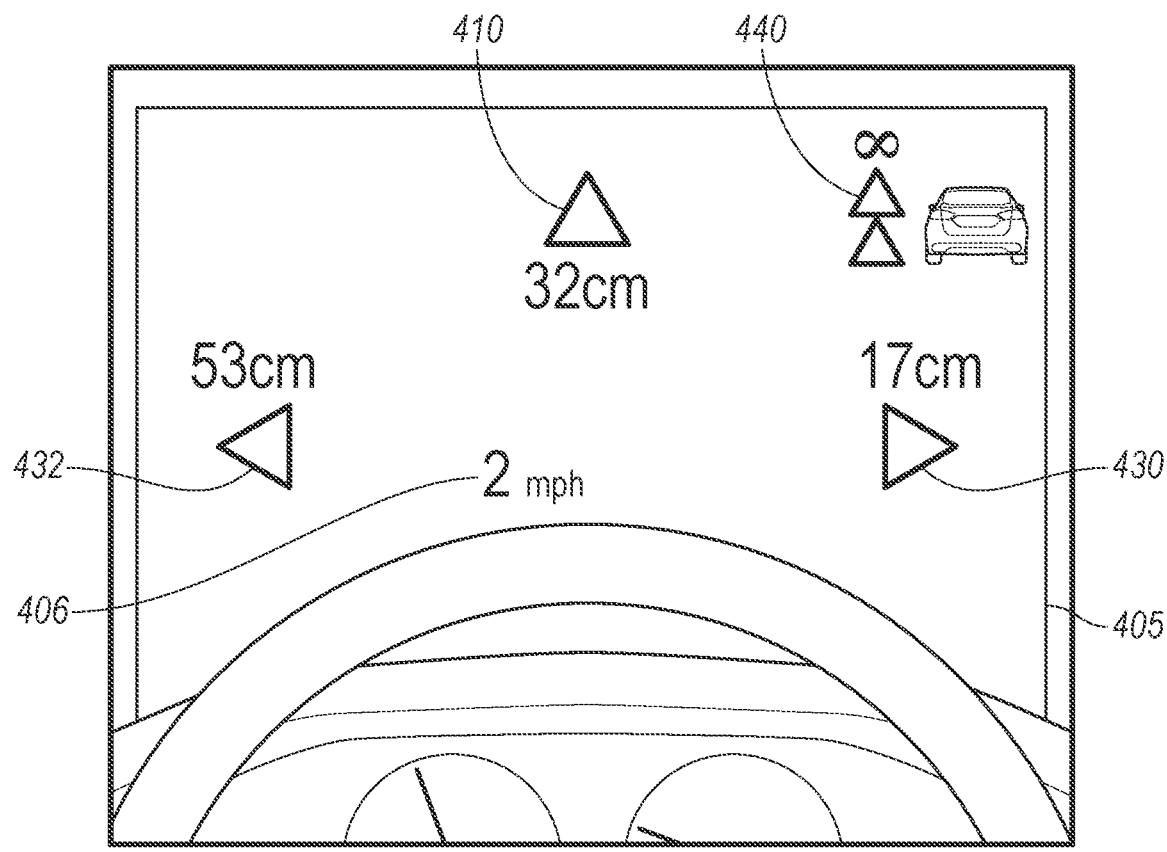
FIG. 4 is an example HUD display with 3-D distance measurements.

With reference to FIG. 4, an example diagram of a heads-up display (HUD) 405 for displaying a distance measurement of the three-dimensional envelope relative to each of the top side, the lateral sides, and the front end side of the vehicle 102 is illustrated. While illustrated as a HUD 405, the display may also be done in a similar manner on an instrument panel display (not shown).

The HUD 405 may display driver information such as vehicle speed 406. When in a slow speed parking operation moving forward, HUD 405 may display a distance measurement (e.g., 32 cm) to a closest object relative to the front end side of the vehicle 102 in association with an indicator 410 (shown as an arrow tip pointing up or forward). HUD 405 may display a distance measurement (e.g., 53 cm) to a closest object relative to the left lateral side of the vehicle 102 in association with an indicator 432 (shown as an arrow tip pointing left), and may display a distance measurement (e.g., 17 cm) to a closest object relative to the right lateral side of the vehicle 102 in association with an indicator 430 (shown as an arrow tip pointing right). The HUD 405 may also display a distance measurement (e.g., effectively infinity when no object detected) to a closest object relative to the top side of the vehicle 102 in association with an indicator 440 (shown as a double arrow tip pointing up).

In an implementation, a color assigned to each of the indicators 410, 430, 432, and 440 and/or their associated numerals/text may depend on a distance range. For example, for a distance measurement greater than 1 meter, an indicator may be assigned green, for a distance measurement between 30 cm and 99 cm, an indicator may be assigned yellow, and for a distance measurement less than 30 cm, an indicator may be assigned red. In a further implementation, distance measurements below 15 cm may, for example, cause the indicator to flash and an audible or haptic indication to pulse, with faster pulsations indicating a smaller distance. Additionally, a constant audible or haptic indication may be indicative of an overshoot or interference condition. These distance ranges are merely examples, and other distance thresholds may be used without departing from the scope of the present disclosure.

Figure 5:
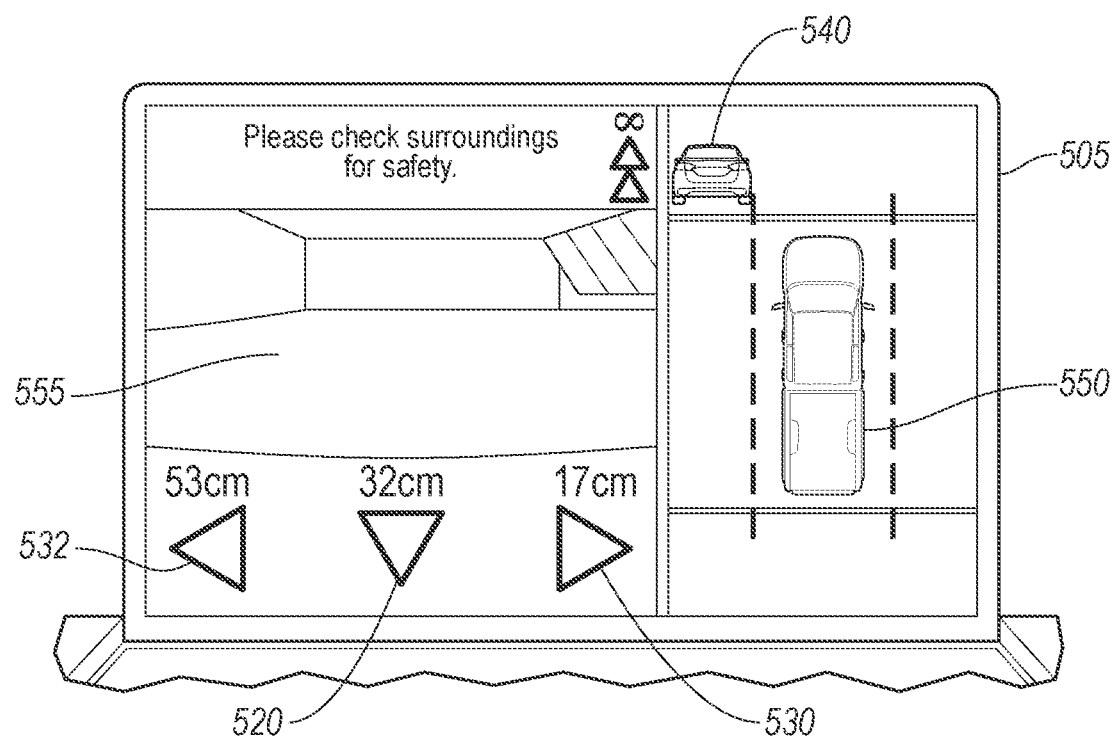
FIG. 5 is an example of a center stack display with 3-D distance measurements.

With reference to FIG. 5, an example diagram of a human-machine interface (HMI) of a center stack display 505 for displaying a distance measurement of the three-dimensional envelope relative to each of the top side, the lateral sides, and the front end side of the vehicle 102 is illustrated. While illustrated as a center stack display 505, the display may also be done in a similar manner on another vehicle display such as an instrument panel display (not shown).

When in reverse, the center stack display 505 may display camera information such as a stitched top view 550 and a back-up camera view 555. When in a slow speed parking operation moving rearward, the center stack display 505 may display a distance measurement (e.g., 32 cm) to a closest object relative to the rear end of the vehicle 102 in association with an indicator 520 (shown as an arrow tip pointing down or rearward). The center stack display 505 may display a distance measurement (e.g., 53 cm) to a closest object relative to the left lateral side of the vehicle 102 in association with an indicator 532 (shown as an arrow tip pointing left), and may display a distance measurement (e.g., 17 cm) to a closest object relative to the right lateral side of the vehicle 102 in association with an indicator 530 (shown as an arrow tip pointing right). The center stack display 505 may also display a distance measurement (e.g., effectively or treated as infinity when no object detected) to a closest object relative to the top side of the vehicle 102 in association with an indicator 540 (shown as a double arrow tip pointing up).

In an implementation, a color assigned to each of the indicators 520, 530, 532, and 540 and/or their associated numerals/text may depend on a distance range, as described with respect to FIG. 4. In a further implementation, parking lines may be indicated in either the top view 550 or the back-up camera view 555.

Figure 6:
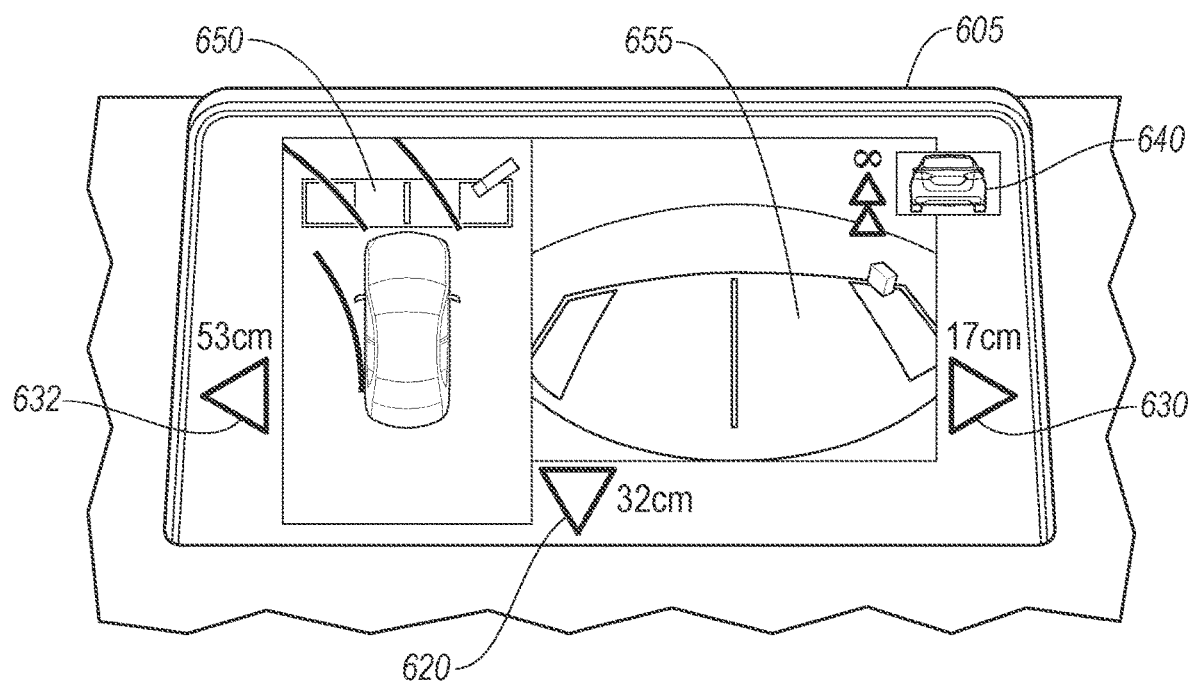
FIG. 6 is another example of a center stack display with 3-D distance measurements.

With reference to FIG. 6, an example diagram of a human-machine interface (HMI) of a center stack display 605 for displaying a distance measurement of the three-dimensional envelope relative to each of the top side, the lateral sides, and the front end side of the vehicle 102 is illustrated. While illustrated as a center stack display 605, the display may alternatively or additionally be provided in a similar manner on another vehicle display such as an instrument panel display (not shown).

When in low speed forward or reverse, the center stack display 605 may display camera information such as a stitched top view 650 with best path markings and a back-up or forward camera view 655, depending on direction. When in a slow speed parking operation moving rearward, the center stack display 605 may display a distance measurement (e.g., 32 cm) to a closest object relative to the rear end of the vehicle 102 in association with an indicator 620 (shown as an arrow tip pointing down or rearward). The center stack display 605 may display a distance measurement (e.g., 53 cm) to a closest object relative to the left lateral side of the vehicle 102 in association with an indicator 632 (shown as an arrow tip pointing left), and may display a distance measurement (e.g., 17 cm) to a closest object relative to the right lateral side of the vehicle 102 in association with an indicator 630 (shown as an arrow tip pointing right). The center stack display 605 may also display a distance measurement (e.g., effectively, or treated as, infinity when no object detected) to a closest object relative to the top side of the vehicle 102 in association with an indicator 640 (shown as a double arrow tip pointing up).

In an implementation, a color assigned to each of the indicators 620, 630, 632, and 640 and/or their associated numerals/text may depend on a distance range, as described with respect to FIG. 4.

Figure 7:
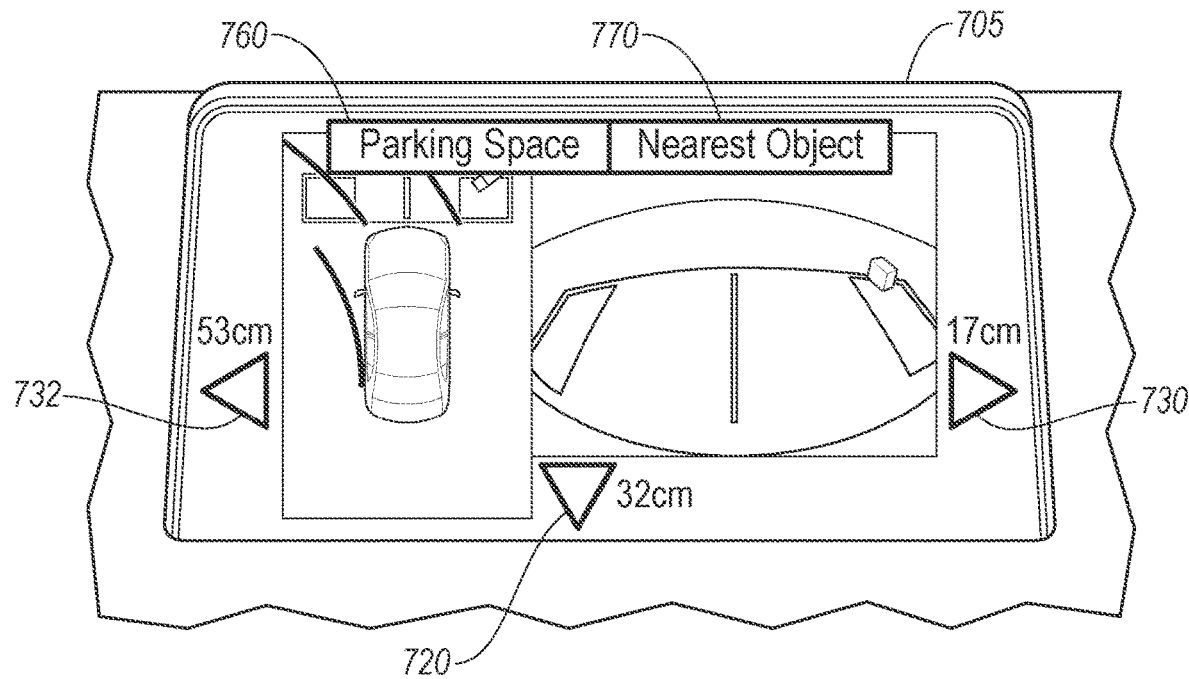
FIG. 7 is another example of a center stack display with 3-D distance measurement display options.

With reference to FIG. 7, an example diagram of a human-machine interface (HMI) of a center stack display 705 for displaying a distance measurement of the three-dimensional envelope relative to each of the top side, the lateral sides, and the front end side of the vehicle 102 is illustrated. While illustrated as a center stack display 705, the display may also be done in a similar manner on another vehicle display such as an instrument panel display (not shown).

The center stack display 705 in an implementation may be a touch screen or include a controller to permit input of user selections. For example, the center stack display 705 may include options for selection of a "Parking Space" option 760 (such as shown in FIG. 6) or a "Nearest Object" option 770 (such as shown in FIG. 5).

When in a slow speed parking operation moving rearward prior to any user selection, the center stack display 705 may display a distance measurement (e.g., 32 cm) to a closest object relative to the rear end of the vehicle 102 in association with an indicator 720 (shown as an arrow tip pointing down or rearward). The center stack display 705 may display a distance measurement (e.g., 53 cm) to a closest object relative to the left lateral side of the vehicle 102 in association with an indicator 732 (shown as an arrow tip pointing left), and may display a distance measurement (e.g., 17 cm) to a closest object relative to the right lateral side of the vehicle 102 in association with an indicator 730 (shown as an arrow tip pointing right).

In an implementation, a color assigned to each of the indicators 720, 730, and 732 and/or their associated numerals/text may depend on a distance range, as described with respect to FIG. 4.

Figure 8:
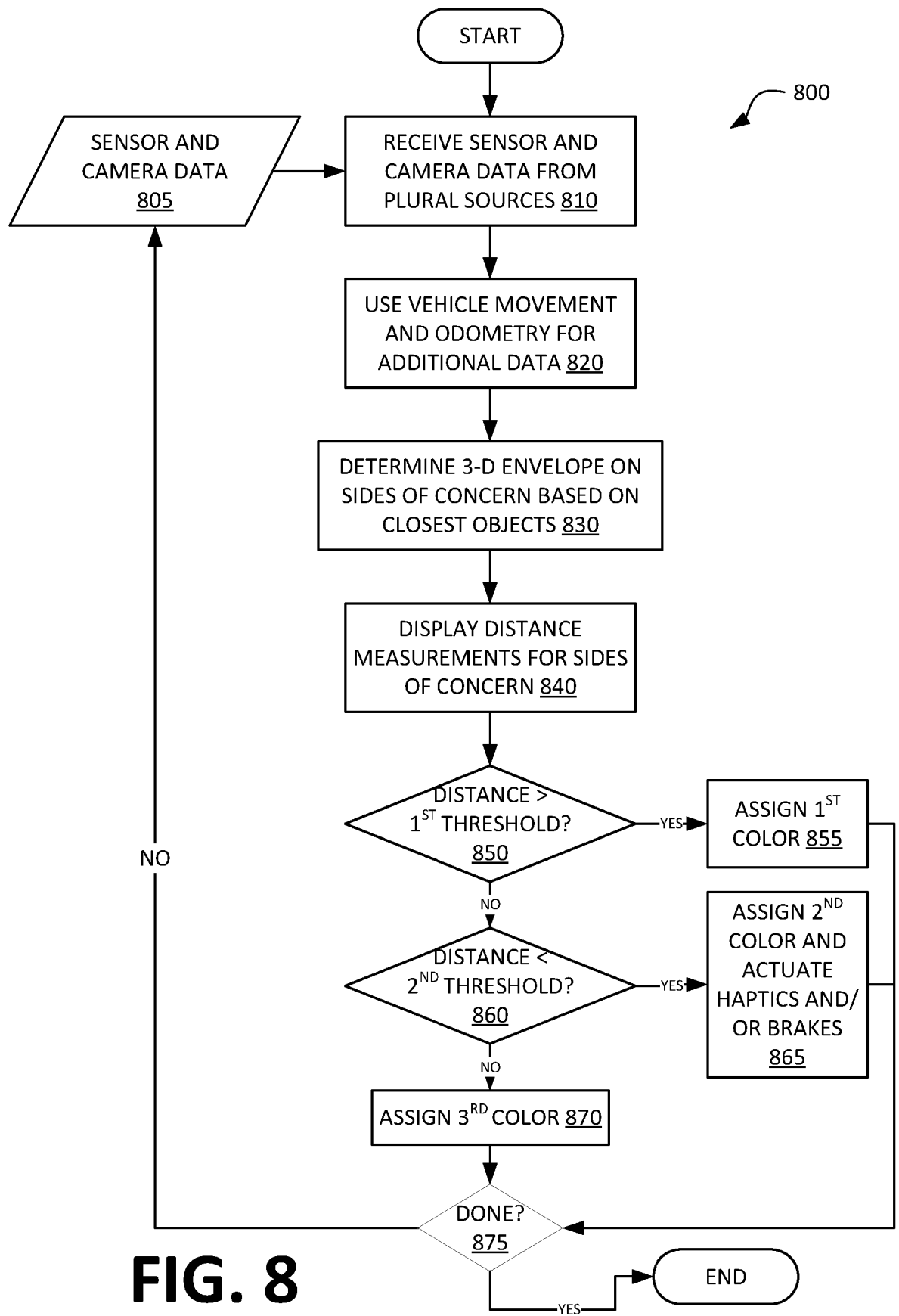
FIG. 8 is an example flow diagram for a process of displaying 3-D parking assist information.

With reference to FIG. 8, an example process 800 for display of 3-D parking assist information is illustrated. Typically, the process 800 will be performed by one or more vehicle computers 104 (e.g., an ECU).

Vehicle 102 may collect sensor and camera data 805 from lateral and forward or rearward facing sensors and cameras 108 to collect data for sides of concern based on the direction of vehicle movement (forward or reverse). When moving forward, the sides of concern are the front, left, right, and top sides of the vehicle 102. When moving in reverse, the sides of concern are the rear, left, right, and top sides of the vehicle 102. Data may be collected from exterior cameras, RADAR, ultrasonic sensors, wheel speed sensors, and wheel angle sensors.

The process starts in a first block 810, wherein computer 104 receives sensor data from a plurality of sources (i.e., input of sensor and camera data 805) for the sides of concern based upon the direction of movement of the vehicle 102 in a parking operation (e.g., below 3 mph).

In a next block 820, the computer 104 uses wheel speed data and wheel direction data to determine vehicle movement and determines additional data, such as the estimated position of objects above vehicle 102 based upon odometry related to the objects previously detected by forward or rearward facing sensors and cameras.

In a block 830, the computer 104 determines a 3-D envelope for the sides of concern based upon a closest detected object in each direction. For example, if two objects are detected in a lateral driver-side direction or the same object is detected by multiple sensors and/or cameras in the lateral driver-side direction, a minimum value of the detected distances will be used to determine the distance to the closest object in the lateral driver-side direction. This is typically performed for all sides of concern based upon the direction the vehicle 102 is moving.

In a next block 840, the computer 104 operates to display the distance measurement for the sides of concern on one or more vehicle displays. The distance measurements may be displayed on one or more of a HUD, an instrument panel display, or another HMI display such as a center stack display used for infotainment.

In an implementation, various ranges of distance measurements may be assigned different colors. For example, in a block 850, the computer 104 may determine whether a distance measurement is greater than a first threshold, such as 100 cm. If the answer at block 850 is "YES", the computer 104 may assign a 1st color associated with the distance measurement, such as green, at a block 855. If the answer at block 850 is "NO", the process 800 may move to a block 860.

In block 860, the computer 104 may determine whether a distance measurement is below a second threshold, such as 30 cm. If the answer at block 860 is "YES", the computer 104 may assign a 2nd color associated with the distance measurement, such as red, at a block 865. The computer 104 may also actuate a haptic notification, such as by seat or steering wheel vibration, and/or may actuate a braking system of the vehicle 102 at block 865. In an implementation, actuation of the braking system may be replaced or combined with activation of other vehicle subsystems 106, e.g., according to an Advanced Driver Assistance System (ADAS), such as actuation of steering and/or propulsion systems to assist in avoidance of an overshoot or interference condition. The process 800 may then move to a block 870.

If the answer at block 860 is "NO", the process 800 moves to a block 870, wherein the computer 104 may assign a third color associated with an intermediate distance measurement between 30 and 100 cm, such as amber or yellow, and the process 800 may move to the block 875.

In block 875, the computer 104 may determine whether the parking operation is completed, i.e., whether the vehicle 102 has been placed in park or has exceeded a parking operation speed. If the answer at block 875 is "YES", the process 800 may end.

If the answer at block 875 is "NO", the vehicle 102 may continue to collect sensor and camera data 805 and return to block 810 for computer 104 to continue with another iteration of process 800.

While disclosed above with respect to certain implementations, various other implementations are possible without departing from the current disclosure.

Use of in response to, based on, and upon determining herein indicates a causal relationship, not merely a temporal relationship. Further, all terms used in the claims are intended to be given their plain and ordinary meanings as understood by those skilled in the art unless an explicit indication to the contrary is made herein. Use of the singular articles "a,""the," etc. should be read to recite one or more of the indicated elements unless a claim recites an explicit limitation to the contrary.

In the drawings, the same or like reference numbers indicate the same or like elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain implementations and should in no way be construed so as to limit the present disclosure.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system, comprising:
a vehicle computer including a processor and a memory, the memory storing instructions executable by the processor to
receive sensor data from a plurality of different sensors with respect to a three-dimensional volume surrounding a top side of a vehicle, lateral sides of the vehicle, and at least one longitudinal end side of the vehicle, wherein the plurality of different sensors include wheel speed sensors, exterior cameras, ultrasonic sensors, and radar sensors;
determine a three-dimensional envelope around the vehicle defined by a closest object relative to each of the top side, the lateral sides, and the at least one longitudinal end side of the vehicle and based upon odometry and movement of the vehicle in a direction of the at least one longitudinal end side of the vehicle;
output a distance measurement of the three-dimensional envelope relative to each of the top side, the lateral sides, and the at least one longitudinal end side of the vehicle on one or more vehicle displays, wherein the distance measurement being a negative distance is indicative of an overshoot or interference condition; and
actuate one or more of a braking system, a steering system, or a propulsion system based on the distance measurement of the three-dimensional envelope relative to any one of the top side, the lateral sides, and the at least one longitudinal end side of the vehicle.

2. The system of claim 1, wherein the closest object relative to the lateral sides and the at least one longitudinal end side includes a parking line or curb.

3. The system of claim 1, the instructions further comprising instructions to:
generate a top view of the vehicle including objects in an environment based upon camera data; and
display the top view on a central vehicle display included in the one or more vehicle displays.

4. The system of claim 3, wherein the distance measurement of the three-dimensional envelope relative to each of the top side, the lateral sides, and the at least one longitudinal end side of the vehicle is displayed on the central vehicle display.

5. The system of claim 4, wherein a display element associated with the distance measurement of the three-dimensional envelope relative to each of the top side, the lateral sides, and the at least one longitudinal end side of the vehicle is assigned a different color for each of a plurality of distance ranges.

6. The system of claim 1, wherein the distance measurement of the three-dimensional envelope relative to each of the top side, the lateral sides, and the at least one longitudinal end side of the vehicle is displayed on a heads-up display (HUD) or instrument panel of the vehicle included in the one or more vehicle displays.

7. The system of claim 6, wherein a display element associated with the distance measurement of the three-dimensional envelope relative to each of the top side, the lateral sides, and the at least one longitudinal end side of the vehicle is assigned a different color for each of a plurality of distance ranges.

8. The system of claim 1, the instructions further comprising instructions to receive an input of a vehicle dimension based upon data received from a user or a camera.

9. The system of claim 1, the instructions further comprising instructions to provide an audio or haptic indication upon the distance measurement of the three-dimensional envelope relative to any one of the top side, the lateral sides, and the at least one longitudinal end side of the vehicle reaching a minimum positive threshold distance.

10. The system of claim 1, the instructions further comprising instructions to adjust a height dimension of the three-dimensional envelope based on sensor data indicating vehicle cargo.

11. The system of claim 1, the instructions further comprising instructions to actuate one or more of the braking system, the steering system, or the propulsion system based on the distance measurement of the three-dimensional envelope relative to any one of the top side, the lateral sides, and the at least one longitudinal end side of the vehicle reaching a minimum positive threshold distance.

12. A method, comprising:
receiving sensor data from a plurality of different sensors with respect to a three-dimensional volume surrounding a top side of a vehicle, lateral sides of the vehicle, and at least one longitudinal end side of the vehicle, wherein the plurality of different sensors include wheel speed sensors, exterior cameras, ultrasonic sensors, and radar sensors;
determining a three-dimensional envelope around the vehicle defined by a closest object relative to each of the top side, the lateral sides, and the at least one longitudinal end side of the vehicle and based upon odometry and movement of the vehicle in a direction of the at least one longitudinal end side of the vehicle;
outputting a distance measurement of the three-dimensional envelope relative to each of the top side, the lateral sides, and the at least one longitudinal end side of the vehicle on one or more vehicle displays, wherein the distance measurement being a negative distance is indicative of an overshoot or interference condition; and
actuating one or more of a braking system, a steering system, or a propulsion system based on the distance measurement of the three-dimensional envelope relative to any one of the top side, the lateral sides, and the at least one longitudinal end side of the vehicle.

13. The method of claim 12, wherein the closest object relative to the lateral sides and the at least one longitudinal end side includes a parking line or curb.

14. The method of claim 12, further comprising:
generating a top view of the vehicle including objects in an environment based upon camera data from the exterior cameras; and
displaying the top view on a central vehicle display included in the one or more vehicle displays.

15. The method of claim 14, wherein the distance measurement of the three-dimensional envelope relative to each of the top side, the lateral sides, and the at least one longitudinal end side of the vehicle is displayed on the central vehicle display.

16. The method of claim 15, wherein a display element associated with the distance measurement of the three-dimensional envelope relative to each of the top side, the lateral sides, and the at least one longitudinal end side of the vehicle is assigned a different color for each of a plurality of distance ranges.

17. The method of claim 12, wherein the distance measurement of the three-dimensional envelope relative to each of the top side, the lateral sides, and the at least one longitudinal end side of the vehicle is displayed on a heads-up display (HUD) or instrument panel of the vehicle included in the one or more vehicle displays.

18. The method of claim 17, wherein a display element associated with the distance measurement of the three-dimensional envelope relative to each of the top side, the lateral sides, and the at least one longitudinal end side of the vehicle is assigned a different color for each of a plurality of distance ranges.

19. The method of claim 12, further comprising receiving an input of a vehicle dimension based upon data received from a user or a camera.

20. The method of claim 12, further comprising providing an audio or a haptic indication upon the distance measurement of the three-dimensional envelope relative to any one of the top side, the lateral sides, and the at least one longitudinal end side of the vehicle reaching a minimum positive threshold distance.

\* \* \* \* \*